United States Patent Office 3,577,216
Patented May 4, 1971

3,577,216
PROCESS FOR THE RECOVERY OF SELENIUM IV UTILIZED AS A CATALYST FOR OXIDATION REACTIONS
Francis Weiss and Andre Lakodey, Pierre-Benite, Rhone, France, assignors to Ugine Kuhlmann, Paris, France
No Drawing. Filed Nov. 24, 1967, Ser. No. 685,282
Claims priority, application France, Nov. 29, 1966, 85,385
Int. Cl. C01b 19/00
U.S. Cl. 23—50
11 Claims

ABSTRACT OF THE DISCLOSURE

A process for the recovery of selenium IV which has been used as a catalyst in the oxidation of organic compounds by oxygen, hydrogen peroxide, or organic peroxides which comprises precipitating a metal selenite from the reaction environment or medium at the end of the oxidation process, separating the precipitated metal selenite from the medium and extracting therefrom selenious acid or anhydride which may be recycled.

---

This invention relates to a process for recovering selenium IV after it has been used as a catalyst in the oxidation of organic compounds.

Selenium IV is frequently employed as an oxidation reactant or catalyst for in solution oxidation by oxygen, hydrogen peroxide, or organic peroxides. It is particularly useful in the synthesis of carboxylic acids by oxidation of ketones, aldehydes, unsaturated fatty acids, keto-acids, etc. Selenium IV is used in its most abundant form, which is selenious dioxide or anhydride, and generally in a polar organic solvent stable against oxidation agents such as acetic acid and tertiary aliphatic alcohols, in which selenious anhydride is soluble.

Because of its high cost, it is essential that as much selenium be recovered at the end of the reaction as is possible; however, this is an exceedingly difficult problem. Numerous solutions have been devised, but none have proved entirely satisfactory. The problems involved in the recovery of selenium can best be understood by reference to one specific oxidation reaction in which selenium is used as a catalyst. Therefore, we shall discuss our invention in connection with the recovery of selenium used as a catalyst in the oxidation of alpha-ethylenic aldehydes into the corresponding carboxylic acids by means of hydrogen peroxide, and, specifically, the oxidation of acrolein into acrylic acid. However, neither our invention or the problem solved by our invention is limited to this specific oxidation reaction.

At the end of the oxidation reaction of acrolein utilizing an aqueous solution of hydrogen peroxide in the presence of selenious anhydride, in a solvent such as tertiary butanol, a homogeneous solution is obtained generally analyzing by weight 10% to 40% acrylic acid, 5% to 20% water, and 0.2% to 4% selenium. The selenium remains essentially in the state of selenium IV. Depending upon the operating conditions, small quantities of unconverted acrolein and peroxide as well as some oxidation or polymerization products may remain in this solution.

Selenium IV simultaneously behaves as both an oxidizing agent and an acid. In the past various attempts have been made to derive a benefit from these properties in order to separate selenium from the other ingredients of the mixture. It has been recommended that the totality of the volatile products be distilled in order to recover the selenium, particularly reduced to the elementary state, in residues, and that this reduction be completed by the addition of sodium bisulphite. The elementary selenium is then separated by filtration and reoxidized into selenious anhydride. However, a recovery of this type is very difficult and relatively costly. It has also been suggested that the residues be burned in order to recover selenium oxide in the combustion gases. This method requires a complicated plant. Another method which has been proposed is to fix the selenium in the form of selenious acid on ion exchanger resins, but a two-fold difficulty is encountered: (1) selectivity is poor and a part of the carboxylic acid is also fixed, and (2) as a general rule, a second partial reduction of the selenium is observed in the resin which renders it partially irretrievable.

More recently a process for separation by selective extraction of selenious acid with an aqueous solution of inorganic salts has been suggested. However, this essentially simple separation provides an aqueous solution in which selenious acid is in the presence of a great quantity of foreign salts. The selenious acid must be separated by extraction in counterflow with a solvent or by other means such as reduction to the elementary state or precipitation in the state of selenite in a neutral or alkaline environment. In these last cases, the active form of the catalyst must also be regenerated by oxidation of the elementary selenium or by double decomposition of selenite with a strong acid before further catalytic oxidations can be performed with it. The successive application of two liquid-liquid extraction operations, or of a liquid-liquid extraction and of a chemical treatment, is relatively costly and, in many circumstances, recovery yields are affected by the multiple nature of the treatments.

We have invented a new process for the recovery of selenium IV used as a catalyst in the oxidation of organic compounds by oxygen, hydrogen peroxide, or organic peroxides which overcomes many of the difficulties encountered in earlier processes. Briefly stated, our process involves precipitating the selenium in the state of metallic selenite within the reaction medium at the end of the oxidation process, and thereafter separating the metal selenite and treating it to recover selenious acid or anhydride.

We have discovered that the addition to the reactive mixtures of a stoichiometrical quantity relative to selenium IV, of an oxide, hydroxide, carbonate of a metal, or of a metal salt of an acid weaker than the selenious acid, causes a selective and almost quantitative precipitation of the corresponding neutral metal selenite. This result is most surprising, since the selenious acid (or anhydride) is in an environment which as a rule contains a substantial portion of water, as well as a carboxylic acid resulting from oxidation of an aldehyde or ketone. Since the seleniuretted compound would ensure action as a catalyst only for the oxidation reaction, it is present in very small portions compared to the carboxylic acid produced. If, however, the selenious acid is a diacid of which the primary acidity was relatively great (ionization constant $K_1 = 3 \times 10^{-3}$) compared to that of the carboxylic acid which is of the order of $10^{-4}$ to $10^{-5}$ (for example, acrylic acid $K = 5.5 \times 10^{-5}$), and its secondary acidity is very low, $K_2 = 5 \times 10^{-8}$, which, in general, is much lower than that of the carboxylic acids. Taking this into account, it should have been expected that a base would neutralize, in sequence, the primary acidity of selenium, then the carboxylic acid, then the secondary acidity of the selenium, which would render it impossible from the start to precipitate a neutral selenium insoluble in the environment without neutralizing the totality of the carboxylic acid present at the same time.

Many metal selenites may be precipitated, but preference is given to alkaline selenites, specifically of sodium, potassium or lithium, to alkaline-earth selenites, specifically calcium, barium and to the selenites of magnesium, zinc and aluminum. The reason for this preference is one of economy, but it is also based on the care necessary to prevent the recycling of the selenious acid or anhydride after decomposition of the selenite from entraining metallic ions into the oxidation medium which may catalyze the decomposition of hydrogen peroxide or any of the other peroxides employed. Generally, the best results are obtained with divalent and trivalent cations. Whereas the precipitation of the alkaline selenites, which is satisfactory in an environment having little water, tends to be incomplete and to be accompanied by the separation from the mixture of an aqueous phase in which they dissolve if the environments to be processed contain more than approximately 10% water.

Our process may be employed in the reactive environments, resulting from the oxidation of the following compounds, which are merely illustrative and not restrictive:

(A) Acyclic ketones having the structure

RR'>CH—CO—R"

in which RR' and R" represent an alkyl or aryl group, alicyclic ketones such as cyclopentanones, cyclohexanones, cyclo-octanones, cyclododecanones or complex ketones, of the steroid group, for example, halogenated ketones such as monochloro-acetone;

(B) Aldehydes such as acetaldehyde, isobutyraldehyde, benzaldehyde, acrolein, methacrolein, croton aldehyde, alpha-chloroacrolein, sorbic aldehyde, 2-ethyl-2-hexeneal, tiglic aldehyde, tetrahydrobenzaldehyde;

(C) Unsaturated fatty acids such as oleic acid or linoleic acid;

(D) Keto-acids such as levulinic acid; and, (E) Thio acids such as mercapto-dipropionic acid.

Our process is exceedingly simple. To the reactive mixture, one adds the required quantity of precipitating agent in solution or suspension in an inert liquid such as water or the solvent employed during the reaction, or simply in the condition of pulverulent solid. This addition is preferably made at the end of the oxidation reaction, at the same or lower temperature. If the oxidation has been performed at a temperature around 40° to 60° C., the addition of the precipitating agent may thus be made at the same temperature, and this may be restored to the ambient value by cooling while the precipitation of the selenite occurs. When the precipitation has been completed, which requires from a few minutes to several hours, depending on the agent employed, the neutral selenite is separated by filtration or decantation.

We prefer to employ precipitating agents that are readily available commercially, such as the oxides of calcium (quicklime), barium, magnesium, or aluminum, or the hydroxides of these same elements, as well as the hydroxides of sodium or potassium, the carbonates and bicarbonates of sodium, potassium, calcium, barium or magnesium. Mixtures of the above may also be employed, or a part of the precipitation may be performed with a specific agent and the remaining part may be made with another. This is partciularly important, where it is possible to precipitate a great portion of the selenium IV with an exceedingly cheap product, which, however, does not allow for the complete precipitation, but where the remaining selenium can be precipitated with a more expensive and also more effective agent. If these precipitation agents are themselves insoluble or slightly soluble in the reactive medium, the speed of precipitation of the corresponding selenite depends primarily on the facility of attack on these products by the acidity of the environments. For this reason, it is advantageous to employ these products in as reactive a form as possible, such as freshly precipitated crystals, gels, fine dispersions, etc.

Instead of placing these agents in direct contact with the mixture containing the selenium, they may be mixed with a solution of carboxylic acid produced and originating, for example, from the recycling of a previous operation, to form a solution or suspension of the salt of this carboxylic acid, and this solution or suspension may be employed to perform the precipitation of the selenite.

The quantity of precipitation agent should be at least stoichiometrical relative to the selenium IV to be precipitated, and this quantity may be exceeded by 10% to 30% for example. It is not, generally, of interest in practice to employ more of the same, since the risk is incurred of equally precipitating the salt of carboxylic acid.

If one wishes, the neutral salt may be purified after it has been separated, by washing it with a little solvent and drying it. It may then either be employed for other applications, or processed to regenerate the selenious anhydride in a known manner, by processing it with a strong inorganic acid. This separate treatment, however, is not essential for recycling. The recycling may be performed in a simpler and more economical manner by placing the filtered selenite into suspension again in the solvent employed for the oxidation process, and then by adding a strong inorganic acid in order to perform double decomposition. A solution of selenious acid (or anhydride) is then obtained in the solvent of the reaction, and the inorganic salt precipitates. A solution of catalyst which may be employed directly, then remains after filtering the salt. According to the particular case, since the quantity of this inorganic salt in suspension depends on the selenium employed, and since this is small as a general rule, it is unnecessary to filter the inorganic salts after every operation. The oxidation may be performed in the presence of this salt which is separated only after a more substantial quantity of the same have accumulated after several operations.

If the step of double decomposition is performed with a strong inorganic acid in solution in the solvent, the filtration of the selenite may also be omitted by separating, by decanting, a thickened mash of this selenite in the reactive mixture, which mash is recycled as is.

Another possibility, which is of practical interest because it renders it possible to save time, consists of performing the double decomposition at the same time as the reaction of the oxidation of the organic compound. To this end, instead of processing the metal selenite before hand with a strong acid to release the selenious anhydride, the metal selenite itself is engaged in the oxidation reaction in the guise of a catalyst supply reactant while at the same time adding to the environment the quantity of strong acid required to release the selenious anhydride. The latter is thus regenerated in situ at the same time the metal salt of the strong acid is formed, which salt is normally insoluble in this environment. It is then sufficient to filter this metal salt at the end of the reaction before precipitating the selenite again, this filtration being apt to be performed every time or after a certain number of operations only. Hydrochloric acid, sulphuric acid, phosphoric acid or nitric acid, may be employed as the inorganic acid.

The following nonlimiting examples illustrate our invention:

EXAMPLE 1

(a) The production of acrylic acid was performed by oxidation of acrolein by means of hydrogen peroxide employing a solution of 117 g. of acrolein at 95.7% (2 mols) and 5.55 g. of selenious anhydride (0.05 mol) in 400 g. of tertiary butanol. 93.5 g. of an aqueous solution of hydrogen peroxide at 76.3% by weight of $H_2O_2$ (2.10 mols) was added in one hour at 40° C. Heating was then applied for 3 hours and 45 minutes at 40° C. to complete the reaction, and 15.8 g. of barium hydroxide $$Ba(OH)_2\text{---}8H_2O$$

(0.05 mol) was added. Stirring was applied for an hour while allowing the mixture to cool to ambient temperature, after which the precipitate of barium selenite was filtered. This precipitate was washed with tertiary butanol and it was dried at 60° C. in a stove. 14.9 g. of this salt was obtained whose analysis showed a purity of 98% to 98.5% of dehydrated barium selenite, which corresponds to a separation yield of approximately 98%.

This yield was confirmed by analysis of the residual selenite in the reactive mixture: the solution weighed 605 g. and contained 130 parts per million of selenium, or 2.02% of the initial quantity employed.

This solution was then processed in conventional manner by fractional distillation, and 132 g. of pure acrylic acid was obtained with a yield of 92% relative to acrolein.

(b) The recycling of the catalyst was then performed in the following manner: the dehydrated barium selenite was placed in suspension again in 400 g. of tertiary butanol, after which 9.8 g. of sulphuric acid at 50% was added, a stoichiometrical quantity, while maintaining agitation for an hour. 117 g. of acrolein was then introduced and the oxidation operation was repeated in conventional manner with 93.5 g. of aqueous solution of hydrogen peroxide at 76.3 of $H_2O_2$. At the end of the reaction, the precipitated barium sulphate was separated, after which 15.8 g. of barium hydroxide was added in order to re-precipitate the selenium.

By the same treatments as before, 14.6 g. was obtained on the one hand of dehydrated barium selenite of a purity of approximately 98.5%, representing a yield of catalyst retrieval of approximately 98%, and 133 g. of acrylic acid, representing a yield equal to the preceding one.

EXAMPLE 2

The test (1a) was repeated, but while employing quicklime, CaO, as a precipitation agent instead of barium hydroxide.

At the end of the oxidation reaction, 3.1 g. of quicklime was thus added (0.055 mol), a surplus of 10% compared to theoretical, and agitation was applied for an hour and the mixture was allowed to return to ambient temperature. Filtration was performed, the precipitate was washed with tertiary butanol, and then stove-dried at 60° C. 10.1 g. of salt consisting of dehydrated calcium selenite of a purity of 98% was obtained which corresponded to a yield exceeding 97%. This yield was confirmed by dosing the residual selenium: after filtration, 602 g. of solution was left, containing 170 parts per million of selenium (calculated as elementary selenium), representing 2.6% of the quantity employed. This solution still allowed a little calcium precipitate to precipitate; after standing for one night, a small quantity of salt was again filtered off, after which the solution contained no more than 128 parts per million of selenium (2% of the total), so that the overall yield of precipitation of the catalyst in the condition of selenite of calcium amounted to 98%.

EXAMPLE 3

Example 2 was repeated employing 5.55 g. of calcium carbonate instead of quicklime, as a precipitation agent. Agitation was applied for three hours before filtering. After filtration of the calcium selenite (9.9 g.), the solution contained no more than 275 parts per million of selenium (4.3% of the initial quantity).

The yield of retrieval thus amounted to between 95.5% and 96%.

EXAMPLE 4

Production of acrylic acid was carried out by employing a solution of 117 g. of acrolein at 96.7% by weight (2 mols) and 5.55 g. of selenious anhydride (0.05 mol) in 400 g. of tertiary butanol. 102 g. of an aqueous solution of hydrogen peroxide at 70.1% by weight of $H_2O_2$ was added in an hour at 40° C. Heating was then applied for three hours at 40° C., after which 2.8 g. of quicklime (0.05 mol) was added. Agitation was applied for an hour while reducing the temperature to 20° C. after which the calcium selenite was filtered and 0.5 g. of barium hydroxide $Ba(OH)_2\text{---}8H_2O$ was added. Agitation was applied for an hour and the precipitate of barium selenite was filtered.

After this treatment, the solution contained no more than 89 parts per million of selenium (1.4% of the initial quantity). The retrieval yield thus reached 98.6%.

While we have described preferred embodiments of our invention, it may be otherwise embodied within the scope of the appended claims.

We claim:
1. A process for the recovery of selenium and its derivatives utilized as a catalyst in a reactive medium for the production of carboxylic acids by the oxidation of organic compounds with oxygen, hydrogen peroxide and organic peroxides comprising:
   (A) adding to the carboxylic acid containing reactive medium prior to separating reaction products, a precipitating agent selected from the group consisting of magnesium, zinc, aluminum, alkali and alkaline-earth metal hydroxides, oxides, carbonates, bicarbonates, and salts of said metals derived from an acid weaker than selenious acid;
   (B) separating said precipitated metal selenite from said medium; and,
   (C) reacting said metal selenite with a strong inorganic acid to obtain one of selenious acid and anhydride.

2. A process as set forth in claim 1 wherein said precipitating agent is added to the reactive medium after said oxidation has been completed.

3. A process as set forth in claim 1 wherein said precipitating agent is added in a stoichiometrical amount relative to selenium.

4. A proces as set forth in claim 1 wherein said precipitating agent is added in an amount about 10% to 30% greater than stoichiometrical amount relative to selenium.

5. A process as set forth in claim 1 wherein said precipitating agent is a powder.

6. A process as set forth in claim 1 wherein said precipitating agent is in a solution or suspension of inert liquid.

7. A process as set forth in claim 1 wherein said precipitating agent is reacted with carboxylic acid produced in the reactive medium prior to its introduction into the reactive medium.

8. A process as set forth in claim 1 wherein said strong inorganic acid is selected from the group consisting of hydrochloric, sulphuric, phosphoric and nitric acid.

9. A process for the recovery of selenium and its derivatives utilized in the form of metallic selenite as a catalyst in reactive medium in the presence of a strong inorganic acid for the production of carboxylic acids by the oxidation of organic compounds with oxygen, hydrogen peroxide, and organic peroxides comprising:
   (A) adding the carboxylic acid containing reactive medium prior to separating reaction products, a precipitating agent selected from the group consisting of magnesium, zinc, aluminum, alkali and alkaline-earth metal hydroxides, oxides, carbonates, bicarbonates, and salts of said metals derived from an acid weaker than selenious acid to precipitate a metal selenite; and
   (B) separating said precipitate selenite from said medium.

10. A process as set forth in claim 9 wherein said separated selenite is reacted with a strong inorganic acid to obtain one of selenious acid and anhydride.

11. A process as set forth in claim 9 wherein said separated metallic selenite is recycled with a strong inorganic acid into the reactive medium to obtain one of selenious acid and anhydride in situ.

References Cited

UNITED STATES PATENTS

| | | | |
|---|---|---|---|
| 2,648,638 | 8/1953 | Richter | 23—139X |
| 3,268,294 | 8/1966 | Roberts | 23—139 |
| 3,433,596 | 3/1969 | Wagenmann et al. | 23—209 |

OTHER REFERENCES

Waitkins et al.: "Chemical Reviews," vol. 36, 1945, pp. 235–289 (pp. 235, 236 and 238 to 243 relied on).

HERBERT T. CARTER, Primary Examiner

U.S. Cl. X.R.

23—139; 260—526, 530; 252—411, 413, 439

UNITED STATES PATENT OFFICE
CERTIFICATE OF CORRECTION

Patent No. 3,577,216            Dated May 4, 1971

Inventor(s) Francis Weiss and Andre Lakodey

It is certified that error appears in the above-identified patent and that said Letters Patent are hereby corrected as shown below:

Claim 9 Column 6 line 66

After --adding-- insert -- to --.

Signed and sealed this 3rd day of August 1971.

(SEAL)
Attest:

EDWARD M. FLETCHER, JR.           WILLIAM E. SCHUYLER, JR.
Attesting Officer                      Commissioner of Patents